US007529918B2

(12) United States Patent
Taunton

(10) Patent No.: US 7,529,918 B2
(45) Date of Patent: May 5, 2009

(54) SYSTEM AND METHOD FOR EFFICIENTLY PERFORMING BIT-FIELD EXTRACTION AND BIT-FIELD COMBINATION OPERATIONS IN A PROCESSOR

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 305 days.

(21) Appl. No.: 11/643,787

(22) Filed: Dec. 22, 2006

(65) Prior Publication Data
US 2008/0022078 A1 Jan. 24, 2008

Related U.S. Application Data

(60) Provisional application No. 60/832,141, filed on Jul. 21, 2006.

(51) Int. Cl.
*G06F 7/00* (2006.01)
*G06F 9/00* (2006.01)
(52) U.S. Cl. .................. 712/300; 712/220; 712/223
(58) Field of Classification Search .............. 712/220, 712/300, 223
See application file for complete search history.

(56) References Cited

U.S. PATENT DOCUMENTS

| | | | | |
|---|---|---|---|---|
| 5,272,703 A | * | 12/1993 | Peters | 370/505 |
| 6,061,783 A | * | 5/2000 | Harriman | 712/224 |
| 6,597,706 B1 | * | 7/2003 | Seery | 370/503 |
| 6,950,922 B2 | * | 9/2005 | Chung et al. | 711/220 |
| 2002/0120828 A1 | * | 8/2002 | Modelski et al. | 712/200 |
| 2002/0126663 A1 | * | 9/2002 | Katzman et al. | 370/389 |
| 2004/0254966 A1 | * | 12/2004 | Sunwoo et al. | 708/200 |
| 2005/0125635 A1 | * | 6/2005 | Symes et al. | 712/221 |
| 2005/0204117 A1 | * | 9/2005 | Carpenter et al. | 712/224 |
| 2006/0101258 A1 | * | 5/2006 | Jones et al. | 712/300 |
| 2007/0011441 A1 | * | 1/2007 | Eichenberger et al. | 712/221 |
| 2007/0124631 A1 | * | 5/2007 | Boggs et al. | 714/724 |

OTHER PUBLICATIONS

VAX-11 Architecture Reference Manual, May 20, 1982, Revision 6.1, Digital Equipement, pp. 4-41 to 4-84.*

* cited by examiner

*Primary Examiner*—Eddie P Chan
*Assistant Examiner*—Idriss N Alrobaye
(74) *Attorney, Agent, or Firm*—Sterne, Kessler, Goldstein & Fox PLLC

(57) ABSTRACT

A system and method for efficiently performing bit-field extraction and bit-field combination operations in a processor is provided. The system includes a plurality of general purpose registers, a plurality of predicate registers, and at least one execution unit configured to extract a plurality of bit fields from a source reservoir and to populate a plurality of destination lanes in response to a single instruction. In addition, the execution unit is configured to write supplied fill data into the source reservoir if the number of bits in the source reservoir is less than a predetermined number. In addition or alternatively, the system may include at least one execution unit configured to combine a plurality of bit fields from a plurality of source lanes into a continuous bit stream in response to a single instruction executable by the processor.

14 Claims, 9 Drawing Sheets

SYSTEM AND METHOD FOR EFFICIENTLY PERFORMING BIT-FIELD EXTRACTION AND BIT-FIELD COMBINATION OPERATIONS IN A PROCESSOR

CROSS REFERENCE TO RELATED APPLICATIONS

This application claims the benefit of U.S. Provisional Application No. 60/832,141, filed Jul. 21, 2006, entitled "System and Method for Efficiently Performing Bit-Field Extraction and Bit-Field Insertion Operations in a Microprocessor," which is incorporated herein by reference in its entirety.

FIELD OF THE INVENTION

The present invention relates generally to signal processing systems, and more specifically, to bit-field extraction and combination instructions for processors in such systems.

BACKGROUND OF THE INVENTION

Multiple tone modulation schemes are currently used in a wide variety of communications systems. For example, discrete multi-tone (DMT) modulation is used with digital subscriber line (DSL) technologies (including both ADSL (Asymmetric DSL) and VDSL (Very high speed DSL), collectively known as "xDSL"). In addition, carrierless orthogonal frequency division multiplex (COFDM) has been widely adopted as a standard for digital terrestrial TV broadcasting.

In these systems, the data to be transmitted are sub-divided across a number of distinct frequencies, also referred to as tones or sub-carriers. These tones are typically integer multiples of a fixed basic frequency. In the case of COFDM, a group of tones is shifted up to a much higher frequency range for transmission from an aerial. The number of tones used in different systems and within an individual system can vary. For example, a low bandwidth ADSL upstream link may use 10 tones whereas an "8K-carrier" COFDM digital TV transmission may use several thousand tones.

Data to be modulated onto the multiple tones for transmission in these systems must be extracted from a stream of processed bits (e.g., the stream of input bits typically undergoes processing such as scrambling, Reed-Solomon encoding, interleaving, etc., prior to transmission) by subdividing the stream of bits into individual bit-fields, where separate fields (each comprising a small number of bits) are used to modulate the separate tones. In addition, data to be demodulated at a receiver must be retrieved from the multiple tones and combined into a continuous bit-stream for further processing by the system, in a process which is the reverse of the bit-field extraction performed at the transmitter.

It is increasingly common for modulation and demodulation operations in systems using multiple tones (for example, an xDSL modem) to be implemented using software running on a programmable processor. However, the bit-field extract and combine operations used in these systems, when effected using conventional instructions that are present on typical processors, can represent a significant portion of the total computational cost for the system. With increasing workloads (e.g., in respect to the average number of tones used in a transmission channel), improving the efficiency of the extract and combine processes in such systems is critical.

What is therefore needed is a system and method that significantly reduces the number of cycles needed to perform bit-field extract and combine operations.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
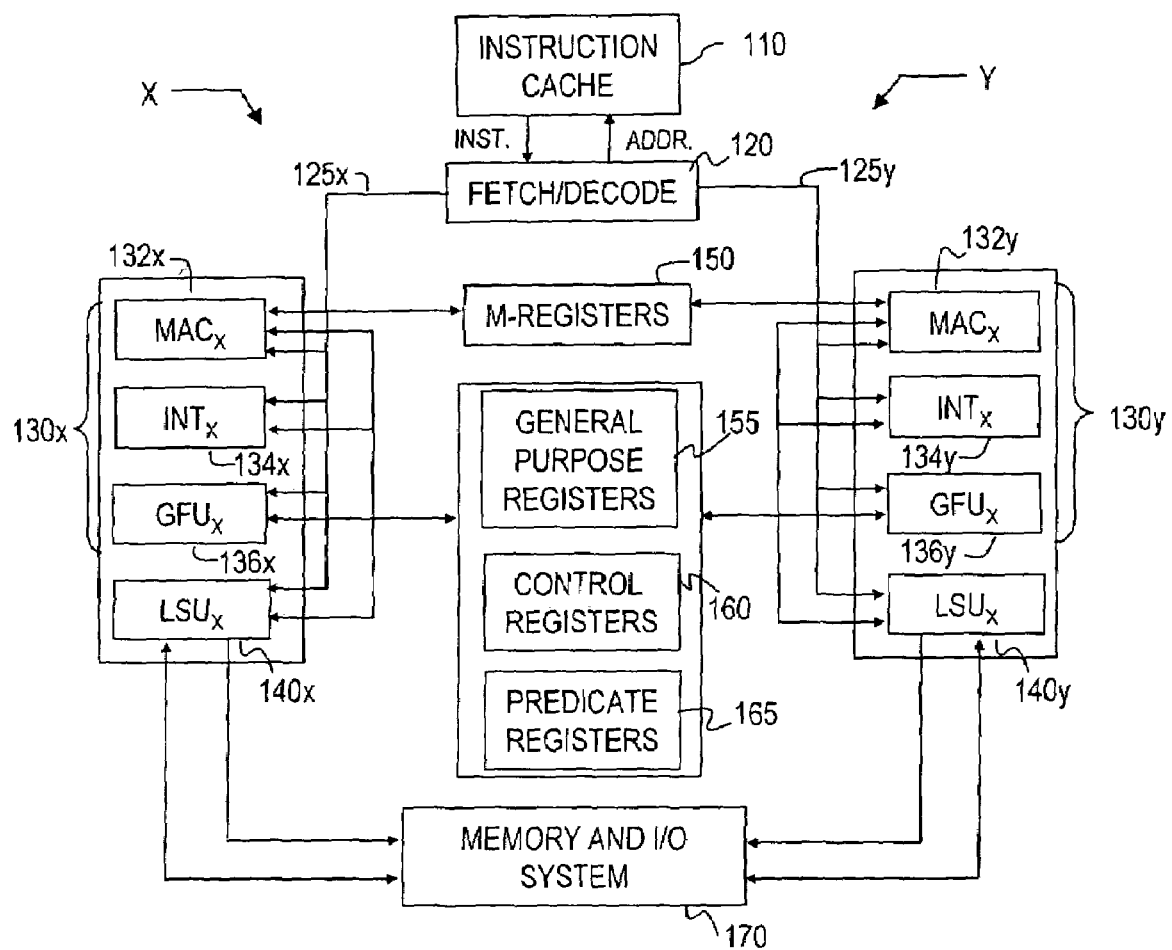
FIG. 1 illustrates an exemplary processor system for use in the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Architecture Overview

FIG. 1 illustrates an exemplary processor system 100 for use in the present invention. In an embodiment, the processor system is a 64-bit long instruction word machine including two parallel Single Instruction Multiple Data (SIMD) units designated by reference letters X and Y. As would be appreciated by a person of skill in the art, other configurations for processor system 100 can be used with the present invention.

Processor system 100 includes an instruction cache 110 for receiving and holding instructions from a program memory (not shown). The instruction cache 110 is coupled to fetch/decode circuitry 120. The fetch/decode circuitry 120 issues addresses in the program memory from which instructions are to be fetched and receives on each fetch operation a 64 bit instruction from the cache 110 (or program memory). In addition, the fetch/decode circuitry 120 evaluates an opcode in an instruction and transmits control signals along channels 125x, 125y to control the movement of data between designated registers and the Multiplier Accumulator (MAC) 132, Integer Unit (INT) 134, Galois Field Unit (GFU) 136, and Load/Store Unit (LSU) 140 functional units.

Processor system 100 includes two SIMD execution units 130x, 130y, one on the X-side of the machine and one on the Y-side of the machine. Each of the SIMD execution units 130x, 130y includes a Multiplier Accumulator Unit (MAC) 132, an Integer Unit (INT) 134, and a Galois Field Unit (GFU) 136. Multiplier accumulator units 132x, 132y perform the process of multiplication and addition of products commonly used in many digital signal processing algorithms. Integer units 134x, 134y perform many common operations on integer values used in general computation and signal processing. Galois field units 136x, 136y perform special operations using Galois field arithmetic such as may be executed in implementations of the Reed-Solomon error protection coding scheme.

In addition, a Load/Store Unit (LSU) 140×, 140y is provided on the X and Y-side SIMD units. Load/store units 140x, 140y perform accesses to the data memory and I/O system 170, either to load data values from the data memory or I/O system into the general purpose registers 155 or to store values to the data memory or I/O system 170 from the general purpose registers 155.

Processor system 100 further includes a data memory and I/O system 170, comprising one or more sections of read-write memory and I/O space, coupled to the X-side and Y-side SIMD units. Although FIG. 1 depicts a direct connection to a memory and I/O system, it would also be possible to access memory by alternative means including an indirect route via a data cache. As would be appreciated by persons of skill in the art, additional or alternative memory storage and I/O implementations can be used with the present invention.

Processor system 100 includes MAC (Multiply-Accumulate) registers ("M-registers") 150 for holding multiply-accumulate results, and multiple general purpose registers 155. In an embodiment, processor system 100 includes four M-registers and sixty-four general purpose registers. Processor system 100 also includes multiple control registers 160 and multiple predicate registers 165.

2. Extract Instructions 2.1 Extract

Figure 2:
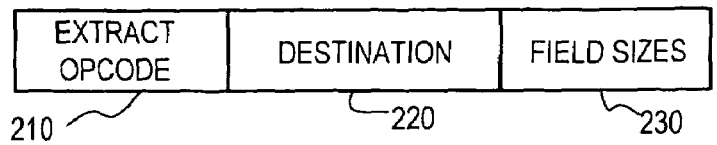
FIG. 2 illustrates an exemplary format for an extract instruction, according to embodiments of the present invention.

FIG. 2 illustrates an exemplary format for an extract instruction 200, according to embodiments of the present invention. Extract instruction 200 extracts multiple consecutive bit-fields from a reservoir of bits and writes the bit-fields, one to each half-word lane of a destination register. The ability to perform this operation for each bit-field directly using a single instruction, rather than using multiple simpler instructions in sequence (such as bit-wise shift, mask/intersection (AND), union (OR), complement (NOT) etc.), yields a performance improvement, compared with conventional processors that use only the simpler types of instructions, by taking fewer cycles to perform a bit-extract function in software. In addition, the ability to perform the extract operation for multiple bit fields at once, by executing a single instruction (i.e. using a Single Instruction, Multiple Data (SIMD) technique), further reduces the number of cycles required to process an input bit stream for transmission. As would be appreciated by persons of skill in the art, the extract instruction may also be useful in other contexts, for example in the processing of variable-sized fields for compressed bit-streams representing signals such as speech, audio, and video.

Figure 3:
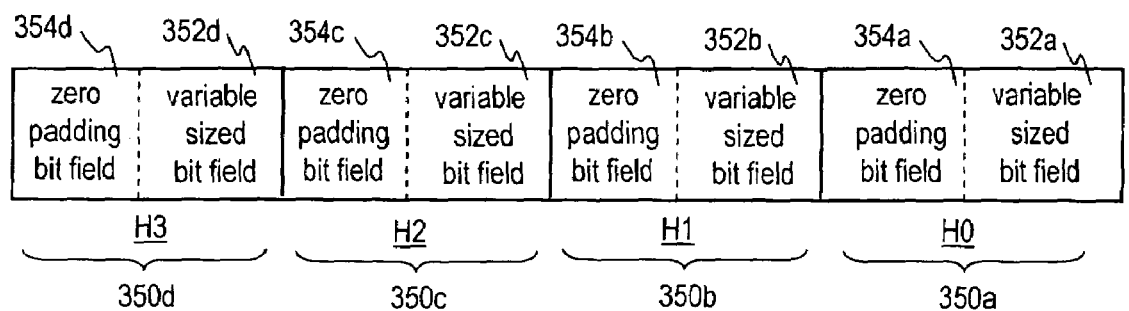
FIG. 3 depicts an exemplary destination register having four half-word lanes.

Extract instruction 200 includes an opcode 210, a destination operand 220, and a field sizes operand 230. The destination operand 220 is a reference to a register (e.g., a general purpose register 155) to which the results of the operation will be written. One skilled in the art will understand that many other ways of organizing extract instruction 200 are possible. In another embodiment, the opcode and the various operands may be presented in a different order. In another embodiment there may be additional bits in the format of the instruction beyond those necessary to represent the opcode and the operands, which do not serve any specific purpose for execution of extract instruction 200. These additional bits may occur in any position or positions within the instruction. In another embodiment, any of the opcode or operands may be represented using a set of bits that do not form a single continuous element as shown in FIG. 2, but are distributed in smaller parts across the instruction. In alternative embodiments, some or all of the operand fields may be implicit and hence not identified explicitly in the instruction; for example, a specific register in the processor (e.g., one of the general purpose registers 155, or another register) may be pre-designated as the location from which a given operand is obtained, or as the destination register to which the result is written. The destination register may contain information allocated as multiple half-word fields (also referred to as lanes). In an embodiment, the destination register may contain sixty-four bits of information allocated as four sixteen-bit half-word lanes. FIG. 3 depicts an exemplary destination register 300 having four half-word lanes 350a-d. Each half-word lane includes a variable sized data bit field 352 and zero-padding bit field 354. The field sizes operand 230 is a reference to a register (e.g., a general purpose register 155) which specifies for each of the destination half-word lanes how many bits are allocated to the data bit field 352 for that lane.

The source for the instruction is a reservoir of bits containing data from an input bit-stream. In an embodiment, this reservoir is located within the processor 100. The exact location of the reservoir is not shown in FIG. 1, and is not in itself critical: in an implementation of this invention, the reservoir may be located at any convenient point For example, it may be located within an execution unit 130x or 130y. The reservoir holds a variable number of bits. In an embodiment, the maximum size of the reservoir is 255 bits. However, the reservoir could be of any convenient size such that it could hold sufficient bits to allow extract operations to be performed without risk of exhausting the reservoir; the minimum size depends on how many bits could be extracted in a single extract operation. The section of the bit-stream represented in the reservoir is viewed as starting at the right-hand (least significant) end of the reservoir and proceeding left-wards towards the most significant end (which contains the bits most recently put into the reservoir). In an embodiment, the source reservoir behaves effectively as a FIFO. As would be appreciated by a person of skill in the art, other implementations for the source reservoir can be used with the present invention. In an alternative embodiment the bits can be stored starting at the left-hand (most significant) end of the reservoir and proceeding rightwards towards the least significant end (containing the bits most recently put into the reservoir).

The following is an exemplary representation of an instance of extract instruction 200 using the format described above in FIG. 2. In the example, 'BXH' is a symbolic representation of the opcode 210, 'fieldsOut' represents the destination operand 220, and 'fieldsSizes' represents the field sizes operand 230.

BXH fieldsOut, fieldSizes

Figure 4:
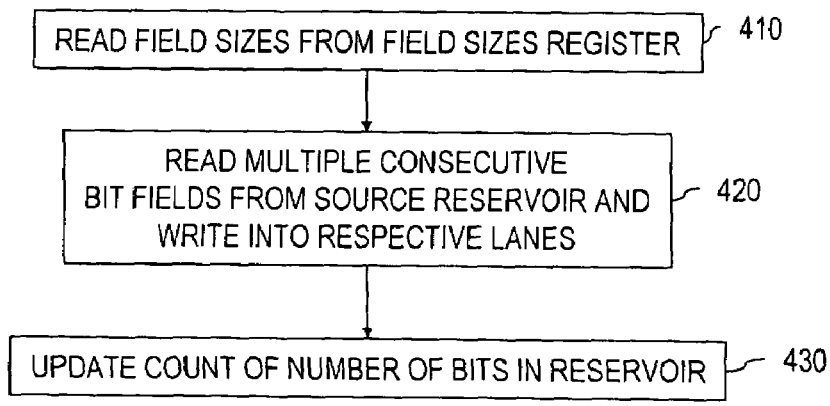
FIG. 4 depicts a flowchart of an exemplary operation of an extract instruction, according to embodiments of the present invention.

FIG. 4 depicts a flowchart 400 of an exemplary operation of instruction 200, according to embodiments of the present invention. Flowchart 400 is described with reference to the example depicted in FIG. 5. However, flowchart 400 is not limited to that example. Note that some of the steps in flowchart 400 do not necessarily have to occur in the order shown.

Figure 5:
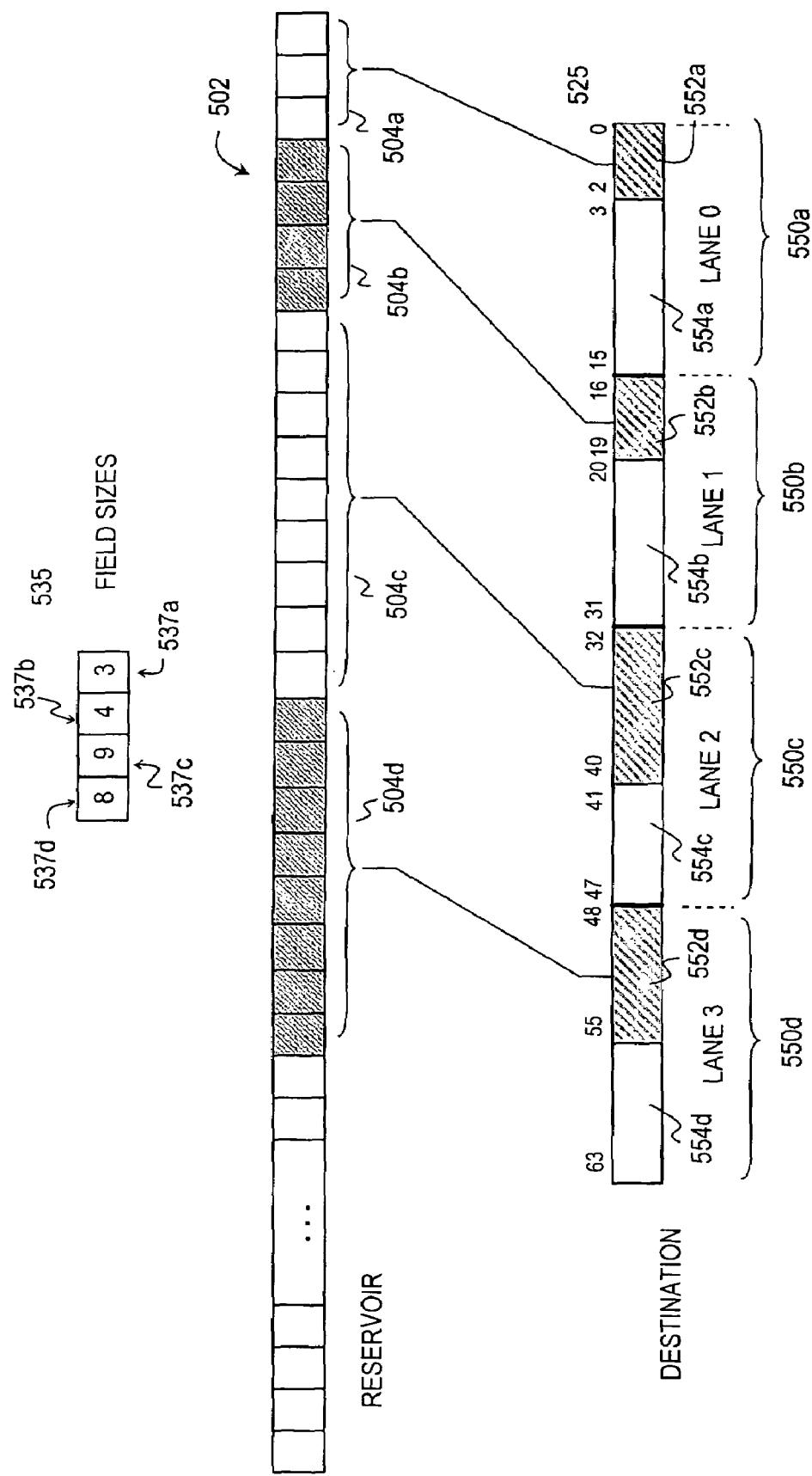
FIG. 5 depicts an example of an extract operation for a four lane destination, according to embodiments of the present invention.

The example of FIG. 5 includes a source reservoir 502, field sizes register 535, and destination register 525. Destination register 525 contains information allocated as four 16-bit half-word lanes 550a-d. Each half-word lane 550 includes a variable sized data bit field 552 and a zero-padding bit field 554. Field sizes register 535 includes four field size values 537a-d, one for each of the four lanes of the destination register 525. In an embodiment, the field sizes register and the destination register are general purpose registers 155. In other embodiments, the size of each lane in the destination register might be smaller than or greater than 16 bits, and the maximum sizes of the bit-fields could correspondingly be smaller or larger. Equally, while the number of bits in each general purpose register 155 in one embodiment is 64, other embodiments might employ smaller or larger register sizes, for example 32 bits or 128 bits; the number of lanes in the destination register could also vary. For example, one embodiment could use four 8-bit lanes in a 32-bit register; in another embodiment, there could be two 32-bit lanes in a 64-bit register or eight 16-bit lanes in a 128-bit register. All of these embodiments are encompassed in the scope of this invention.

In step 410, the field size for the variable sized data bit field for each lane of the destination is read from the field sizes register. In an embodiment, the field size of each data bit field can have a value between 0 and 16 bits. In another embodiment, the field size of the data bit field can take a larger or smaller range of values, for example from 0 to 32 bits, or from 0 to 8 bits, depending on the width of each lane in the destination register. As illustrated in FIG. 5, the field size for lane 0 (550a) is 3 bits; the field size for lane 1 (550b) is 4 bits; the field size for lane 2 (550c) is 9 bits; and the field size for lane 3 (550d) is 8 bits.

In step 420, multiple consecutive data bit fields are read from the source reservoir and written into their respective lanes in the destination. The field sizes read in step 410 determine the number of bits to be read for each data bit field. The extract instruction reads bits from the source reservoir and provides the bits to the data bit field in each lane of the destination. The instruction writes the extracted bits forming each field at the least-significant end of the respective half-word lane of the destination. The remaining bits (the zero-padding bit field) in the half-word lane are set to zero. As will be appreciated by one skilled in the art, it would be possible in an alternative embodiment of the present invention to place the extracted bits at the most significant end of the respective lane of the destination register, and set the least significant bits to zero.

The bit fields are extracted from the reservoir in order. The first bits extracted from the reservoir form the first variable sized data bit field and are written into the least significant lane of the destination, with later extracted bits, forming later variable sized data bit fields, being written to more significant lanes (further left) in order. In an alternative embodiment, it would also be possible to use a different order of assignment, such that the first bit field is written to the data bit field of the most significant lane of the destination, with later extracted bits, forming later variable sized data bit fields, being written to less significant lanes (further right) in order.

As shown in the example of FIG. 5, the first bit field 504a of reservoir 502, having 3 bits, is written into the data bit field 552a of lane 0 (550a). The remaining bits in lane 0 (i.e., field 554a) are set to zero. The next bit field 504b, having 4 bits, is written into the data bit field 552b of lane 1 (550b) and the remaining bits in lane 1 are set to zero. In the same way, the third and fourth bit fields of the reservoir, having 9 and 8 bits respectively, are written into data bit fields 552c and 552d, and the remaining bits of each lane are set to zero.

In step 430, the count of the number of bits in the reservoir is updated. As discussed above, the reservoir holds a variable number of bits. The bit count represents the number of bits currently in the reservoir. In this step, the bit count prior to the extract instruction is reduced by the number of bits extracted in execution of the extract instruction. For example, in FIG. 5, assume that reservoir 502 held 245 bits prior to the extract instruction. After completion of the extract instruction, the bit count would be set to 221 (245−(3+4+9+8)).

2.2 Extract with Fill

Figure 6:
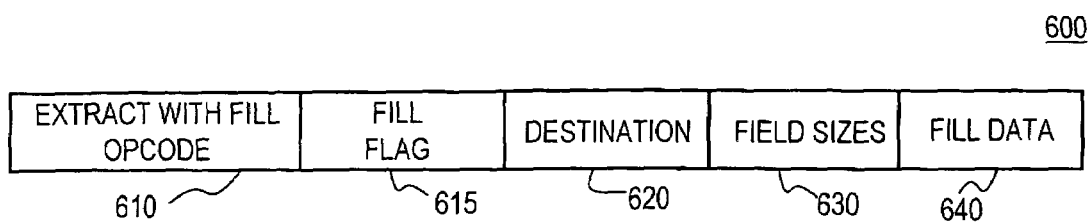
FIG. 6 illustrates an exemplary format for an extract with fill instruction, according to embodiments of the present invention.

FIG. 6 illustrates an exemplary format for an extract with fill instruction 600, according to embodiments of the present invention. Similar to extract instruction 200, extract with fill instruction 600 extracts multiple consecutive bit-fields from a reservoir of bits and writes the bit-fields, one to each half-word lane of a destination register. In addition, if sufficient room exists in the reservoir, extract with fill instruction 600 reads fill data in order to refill the reservoir conveniently and efficiently. It indicates whether or not that this has happened by writing to a fill flag.

Extract with fill instruction 600 includes an extract with fill instruction opcode 610, a fill flag operand 615, a destination operand 620, a field sizes operand 630, and a fill data operand 640. Destination operand 620 and field sizes operand 630 were described above in reference to FIG. 2. One skilled in the art will appreciate that many other ways of organizing extract instruction 600 are possible. In another embodiment, the opcode and the various operands may be presented in an order different from that shown in FIG. 6. In another embodiment there may be additional bits in the format of the instruction beyond those necessary to represent the opcode and operands, which do not serve any specific purpose for execution of extract with fill instruction 600. These additional bits may occur in any position or positions within the instruction. In another embodiment, any of the opcode or operands may be represented using a set of bits that do not form a single continuous element as shown in FIG. 6, but are distributed in smaller parts across the instruction. In alternative embodiments, some or all of the operand fields may be implicit and hence not identified explicitly in the instruction; for example, a specific register in the processor (e.g., one of the general purpose registers 155, or another register) may be pre-designated as the location from which a given operand is obtained, or as the destination register to which a result is written. Fill data operand 640 identifies a register or registers containing data bits to refill the reservoir if appropriate. In an embodiment, the fill data operand refers to a consecutive pair of the general purpose registers 155, containing 128 bits in total, identified by the register number of the first register of the pair. For example, in a particular instance of extract with fill instruction 600, the fill operand could refer to general registers numbered 22 and 23, and so the fill data operand 640 could contain the number 22. In another embodiment, fill data operand 640 could be split into separate parts, each of which identifies one of the two fill data registers independently. In an embodiment, the first 64 data bits to be added to the reservoir come from the first register (e.g., register 22) and the second 64 data bits come from the second register (e.g., register 23); alternative embodiments might use a different arrangements of the data bits to the registers containing the fill data. As would be appreciated by persons of skill in the art, a single fill data register, rather than a pair of registers, could be used with the present invention. Further note that the fill data register(s) can include any convenient number of bits, as required by an application. For example, an alternative embodiment might use only 32 bits of data, from one register, as the implementation of fill data operand 640. Fill flag operand 615 identifies a register or other location (for example one of the predicate registers 165) which is written with an indication as to whether or not the supplied fill data was read from the fill data register(s) and written to the reservoir.

The following is an exemplary extract with fill instruction using the format described above in FIG. 6. In the example, 'BXRH' is the symbolic representation of opcode 610, the compound symbolic operand 'fill0/fill1' identifies a pair of general purpose registers 155 to form the fill data operand 640 and the symbolic operand 'filled' identifies one of the predicate registers 165 as the fill flag operand 640. The 'fieldsOut' and 'fieldSizes' symbolic operands serve the same purpose as in the extract instruction 200 described above.

BXRH (filled,fieldsOut), fill0/fill1, fieldSizes

Figure 7:
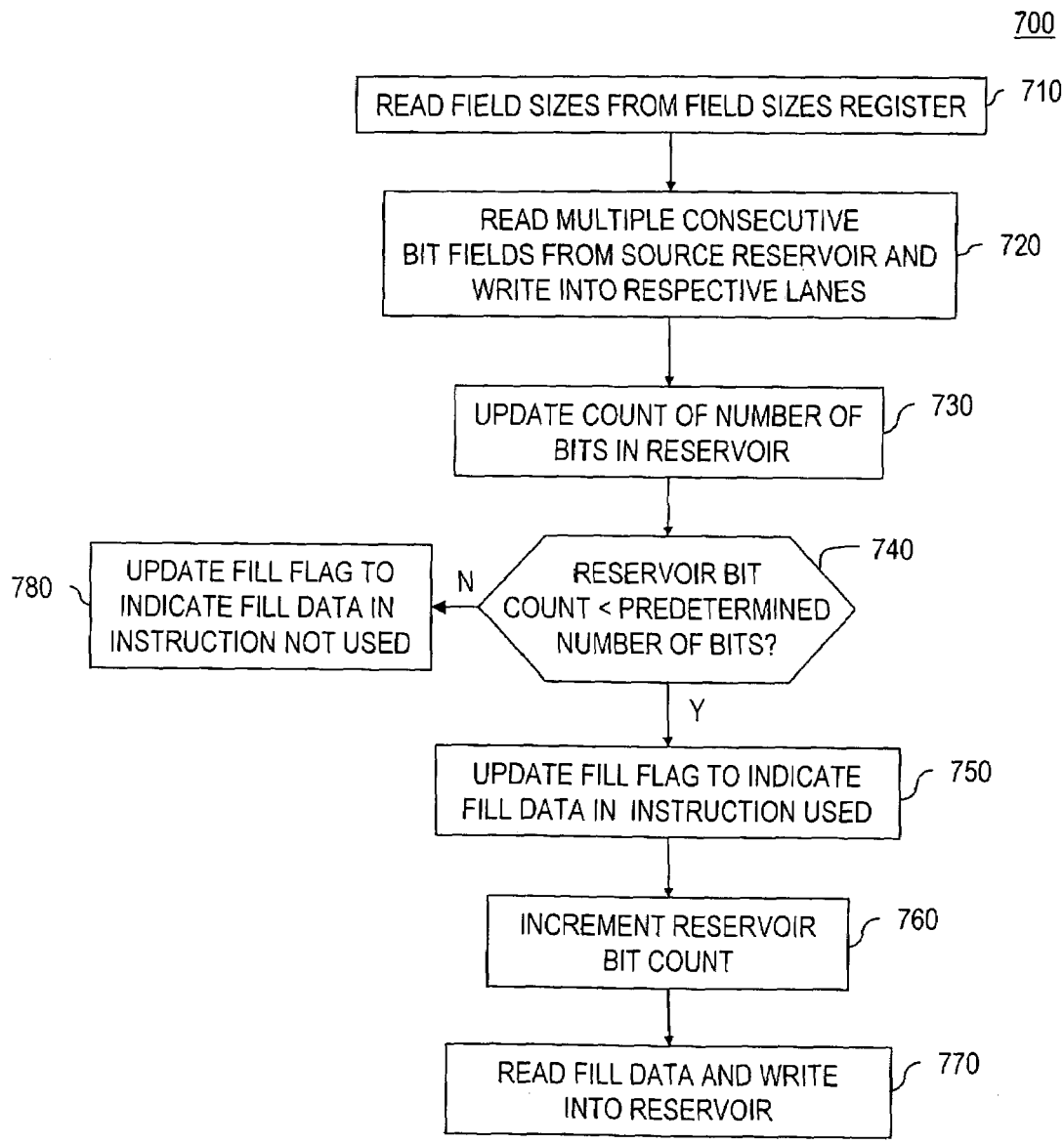
FIG. 7 depicts a flowchart of an exemplary operation of an extract with fill instruction, according to embodiments of the present invention.

FIG. 7 depicts a flowchart 700 of an exemplary operation of an extract with fill instruction 600, according to embodiments of the present invention. Note that some of the steps in flowchart 700 do not necessarily have to occur in the order shown.

In step 710, the field size for the data bit field of each lane of the destination is read from the field sizes register. In an embodiment, the field size of the data bit field can have a value between 0 and 16 bits. In another embodiment, the field size of the data bit field can take a larger or smaller range of values, for example from 0 to 32 bits, or from 0 to 8 bits, depending on the width of each lane in the destination register.

In step 720, multiple consecutive bit fields are read from the source reservoir and written into their respective lanes in the destination. The bit field sizes read in step 710 determine the number of bits to be read for each data bit field. The instruction writes the extracted bits forming each field at the least-significant end of the respective half-word lane of the destination. The remaining bits in the half-word lane are set to zero. The bit fields are extracted from the reservoir in order. The first bits extracted from the reservoir form the first variable sized data bit field and are written into the least significant lane of the destination, with later extracted bits, forming later data bit fields, being written to more significant lanes (further left) in order. As was explained in relation to operation of extract instruction 200, in alternative embodiments, the size and number of lanes in the destination register, the position of the extracted bits in each lane of the destination register, and the order of assignment of fields to the respective lanes of the destination register, could all be chosen from a number of possibilities, to suit the particular application.

In step 730, the count of the number of bits in the reservoir is updated. As discussed above, the reservoir holds a variable number of bits. The bit count represents the number of bits currently in the reservoir. In this step, the bit count prior to the extract with fill instruction is reduced by the number of bits extracted during the extraction part of the instruction's operation.

In step 740, a determination is made whether the reservoir bit count is less than a predetermined number of bits. The value for the predetermined number of bits is based on the maximum size of the reservoir and the number of bits used for refill. For example, if 128 bits are to be used for the refill of a 255 bit reservoir, a determination is made whether the reservoir has at least 128 free bit positions; this is equivalent to the reservoir having no more than 127 filled bit positions (128+127=255). If the bit count is less than the predetermined number (128 (127+1) in the example), operation proceeds to step 750. If the reservoir bit count is greater than or equal to the predetermined number operation proceeds to step 780. In an embodiment, the determination is made before the bit count is reduced by the number of bits being removed from the reservoir by execution of the extract with fill instruction; in an alternative embodiment, the determination may be made after the bit count is thus reduced.

In step 750, a fill flag is written with a particular value to indicate that the bits contained in the fill data register(s) were used in the instruction. In an embodiment, the fill flag is a predicate register 165. In an embodiment, the particular value written as the indication that fill data bits were used is a set of 8 bits, all of which have the binary value '1' (i.e. set). In other embodiments, a different value could be written to indicate that the data bits from the fill data register(s) were written to the reservoir, for example a '0' value (i.e. clear) or a set of '0's. In other embodiments, the indication might be written not to a predicate register 165 but to some other type of register or memory to hold the indication, for example a single bit register or a general purpose register 155. In embodiments using more than a single bit value as indication, the value of all the bits of a multi-bit indicator need not be the same, for example an eight-bit sequence '00000001' could have the equivalent meaning.

In step 760, the reservoir bit count is incremented by the number of bits contained in the fill data register(s). For example, if, as in one embodiment, two 64-bit registers are specified to form the fill data operand 640, the registers include 128 bits total, so the reservoir bit count would be incremented by 128.

In step 770, data bits are read from the fill data registers and written into the reservoir in a FIFO manner, occupying locations immediately following the last bit(s) previously written there, or at the start location (first bit) of the reservoir and onwards, if no bits were previously written to it or it is now empty.

In step 780, a fill flag is written with a value to indicate that the bits contained in the fill data register(s) were not used in the instruction. In this case, the data bits available in the fill operand 640 (comprised of one or more fill data registers) are essentially ignored. The bits in the fill data register(s) may be retained (under software control) for use in the next execution of an extract with fill instruction. The value that is written as the fill flag, indicating that the fill data bits were not used, must be distinct from the value written at step 760 for the case that the supplied bits of fill data bits were used; the same possibilities, for alternative embodiments, as to the size, format and location of the fill flag, as a predicate or other form of indication, also apply equally in this case.

In exemplary applications, such as xDSL, it would be typical to produce the stream of bits, from which the bit-fields are subsequently extracted, in the form of a buffer of consecutive data bits in a memory, for example, in a section of memory system 170. The process of performing bit-field extraction and encoding in this case would include a step of loading data from the memory before it is transferred into the reservoir by performing an extract with fill operation. In some embodiments, the time taken to load new data from the buffer in memory (counted in units of cycles, between when a memory load instruction is issued, and when the data is available in the register to which the load operation will transfer it) could be significantly larger than the time required to perform both an extract operation or an extract with fill operation, and any required further operations on the extracted bit-fields. Therefore, additional efficiency can be achieved during an extraction process by interspersing extract and extract with fill instructions, such that the loading of new fill data from the memory buffer makes available enough data bits in the reservoir to support the execution of both the extract with fill operation which will potentially read the loaded data to fill the reservoir, and a subsequent one or more extract operations that do not read more data into the reservoir. As soon as the extract with fill instruction has completed, the next load of fill data from the buffer can be issued if appropriate, to ensure that fill data will be available in time for the next extract with fill operation.

Figure 8:
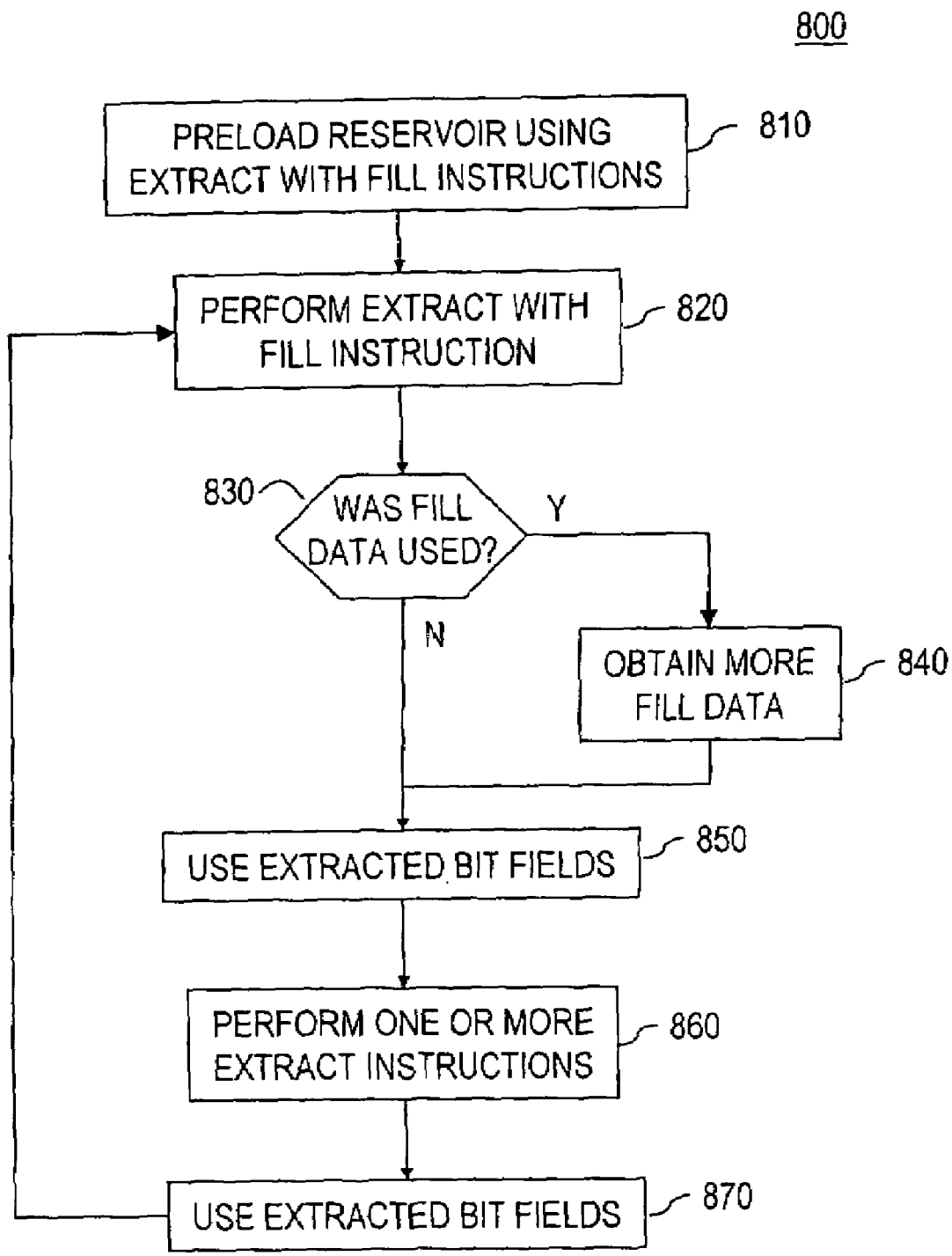
FIG. 8 depicts a flowchart of an exemplary ordering of extract and extract with fill instructions to maximize efficiency, according to embodiments of the present invention.

FIG. 8 depicts a flowchart 800 of an exemplary ordering of extract and extract with fill instructions to maximize efficiency of the processing of an input bit stream for transmission, according to embodiments of the present invention. Note that some of the steps in flowchart 800 do not necessarily have to occur in the order shown.

In step 810, the reservoir is preloaded using one or more extract with fill instructions 600, described above. Initially, the reservoir is marked as empty. Bits are added to the reservoir (a predetermined number of bits at a time) by executing extract with fill instructions while the reservoir has at least a predetermined number of free bit positions. During this preload step, the field sizes register contains zero as the number of bits being requested for each lane, and no use is made of the destination register of each extract with fill instruction, since it will be filled entirely with zero padding bits.

In normal operation, a minimum number of bits must be stored in the reservoir at the start of an extract operation, in order to be able to satisfy the maximum possible demand for bits. In the example of FIG. 5, the maximum possible demand for bits is sixty four (sixteen bits for each of four lanes) in a single extract operation. Therefore, the reservoir must include at least sixty four bits prior to an extract operation in the general case. However, because of the latency of refilling the reservoir from values loaded from memory, it is commonly necessary to preload the reservoir with more than sixty four bits, depending on the average rate of extraction. In particular cases where the number of bits needed is known to be less than the maximum, the amount of data pre-loaded may nonetheless be reduced.

In step 820, an extract with fill operation is performed. The extract with fill operation was described above in relation to FIG. 7.

In step 830, a determination is made whether fill data was used during the extract with fill instruction. In an embodiment, this determination is made by examining the value of the fill flag. If fill data was used during the extract with fill instruction, operation proceeds to step 840. If fill data was not used during the extract with fill instruction, operation proceeds to step 850.

In step 840, the obtaining of new fill data is performed or initiated. For example, obtaining new fill data may be achieved by executing an appropriate load instruction to read data from memory into a general purpose register or register. The new fill data can be fetched from memory even while steps 850 through 870 are being performed. Alternative methods of obtaining fill data are possible, including operations which make fill data immediately available.

Note that one or more of steps 850 through 870 can occur substantially in parallel with the obtaining of new fill data described above.

In step 850, the extracted bit fields are used. For example, in some application, further operation on the extracted bit fields may be required.

In step 860, one or more extract operations are performed. As discussed above, the extract operation does not involve a reading of fill data in order to refill the reservoir. The number of successive extract operations performed in step 860 is dependent upon the expected latency of step 840 in obtaining more fill data (e.g., by loading it from memory).

In step 870, the extracted bit fields are used. Operation then returns to step 820. By the time step 820 is to be performed again, the new fill data has arrived from memory, or has been obtained by other means, into the relevant register(s) and so is available for use in the extract with fill instruction.

2.3 Extract and Extract with Fill in Trellis Encoding Mode

Trellis coded modulation is a common modulation technique used to increase transmission efficiency. For example, trellis coded modulation is included as an optional capability in national and international standards for digital subscriber line (DSL) technologies including, but not limited to, asymmetric DSL (ADSL), ADSL2, and VDSL (Very high speed DSL) 2. At a high level, trellis coded modulation encodes data using a convolutional code prior to modulation such that the original data can be recovered (with a given degree of reliability) at the receiver, in the presence of a higher level of noise in the received signal than could be tolerated without the use of trellis encoding.

Figure 11:
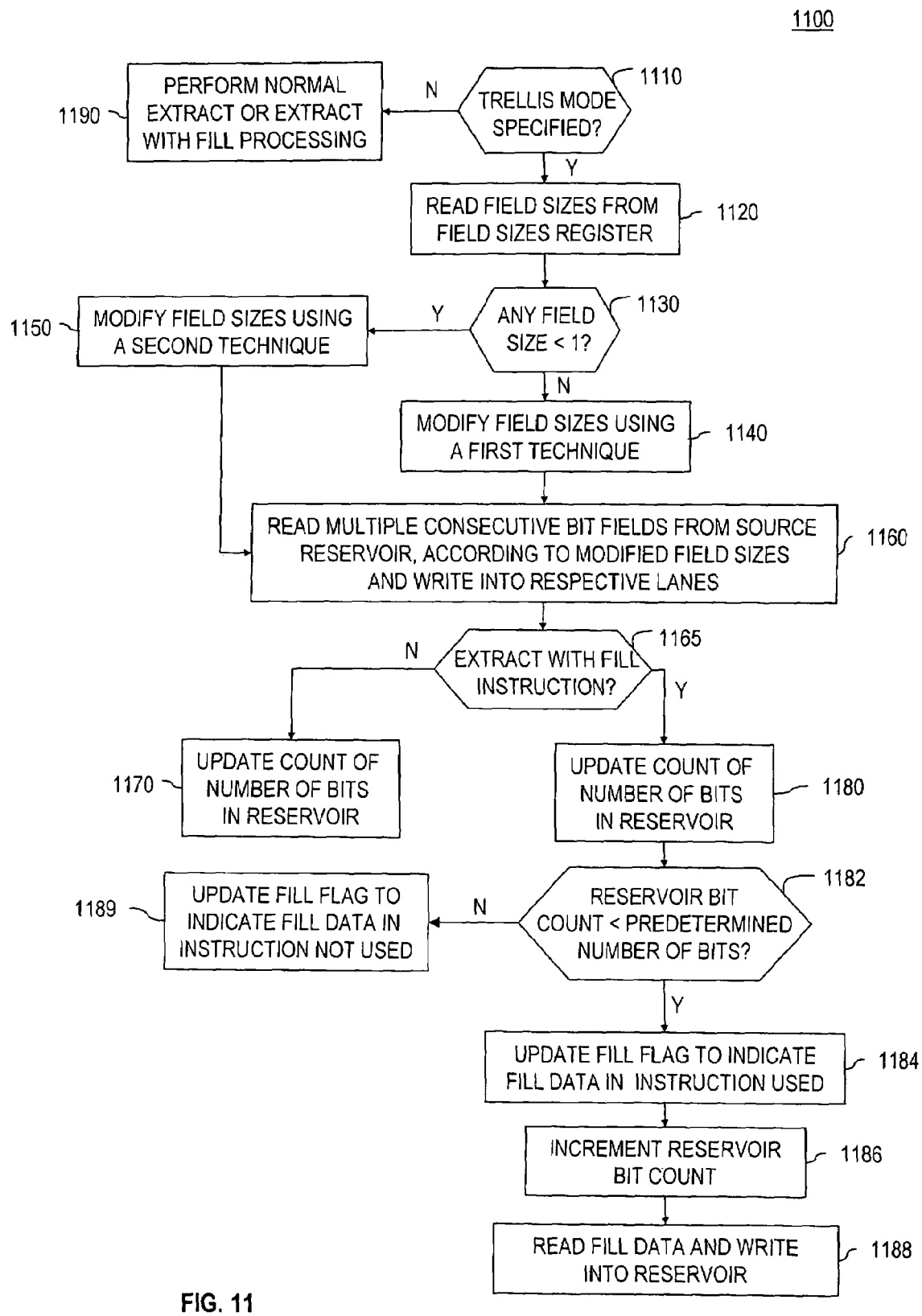
FIG. 11 depicts a flowchart of an exemplary operation of extract and extract with fill instructions in a trellis encoding mode, according to embodiments of the present invention.

When trellis encoding is being used, the number of bits extracted from the reservoir is modified to allow for one trellis bit per pair of bit-fields, assuming each bit-field represents data bits to be modulated onto a quadrature amplitude modulation (QAM) tone. FIG. 11 depicts a flowchart 1100 of an exemplary operation of extract and extract with fill instructions in trellis encoding mode, according to embodiments of the present invention. Note that some of the steps in flowchart 1100 do not necessarily have to occur in the order shown.

In step 1110, a determination is made whether trellis mode has been specified. In an embodiment, a trellis mode flag is used to indicate whether trellis mode is to be used in the instruction. In alternative embodiments, other means may be used to specify trellis mode. One means is by using distinct values of opcode. For example, a first value of opcode 210 might identify an extract instruction that should use trellis mode, and a second value could specify an extract instruction that should not use trellis mode; an equivalent distinction could likewise be made for extract with fill opcode 610. If trellis mode is specified, operation proceeds to step 1120. If trellis mode is not specified, operation proceeds to step 1190.

In step 1120, the field size for the bit field of each lane of the destination is read from the field sizes register.

In step 1130, a determination is made whether any of the field sizes in the field sizes register are less than or equal to 1. If one or more of the field sizes is less than or equal to 1, operation proceeds to step 1150. If each of the field sizes is greater than 1, operation proceeds to step 1140.

In step 1140, the fields sizes read from the field sizes register are modified according to a first technique. Step 1140 represents the most common situation where each tone has more than one data bit. In an embodiment of the first technique, the field sizes are alternatively incremented by 1 and decremented by 2. For example, in the four lane embodiment depicted in FIG. 5, the field sizes are updated by the first technique as follows:

fieldSizesMod.lane0=fieldSizes.lane0+1 fieldSizesMod.lane1=fieldSizes.lane1−2 fieldSizesMod.lane2=fieldSizes.lane2+1 fieldSizesMod.lane3=fieldSizes.lane3−2

In step 1150, the field sizes read from the field sizes register are modified according to a second technique. The second technique relates to the special situation where the number of bits requested for one or more of the lanes (i.e., one of the field sizes) is 1 or 0.

Figure 12:
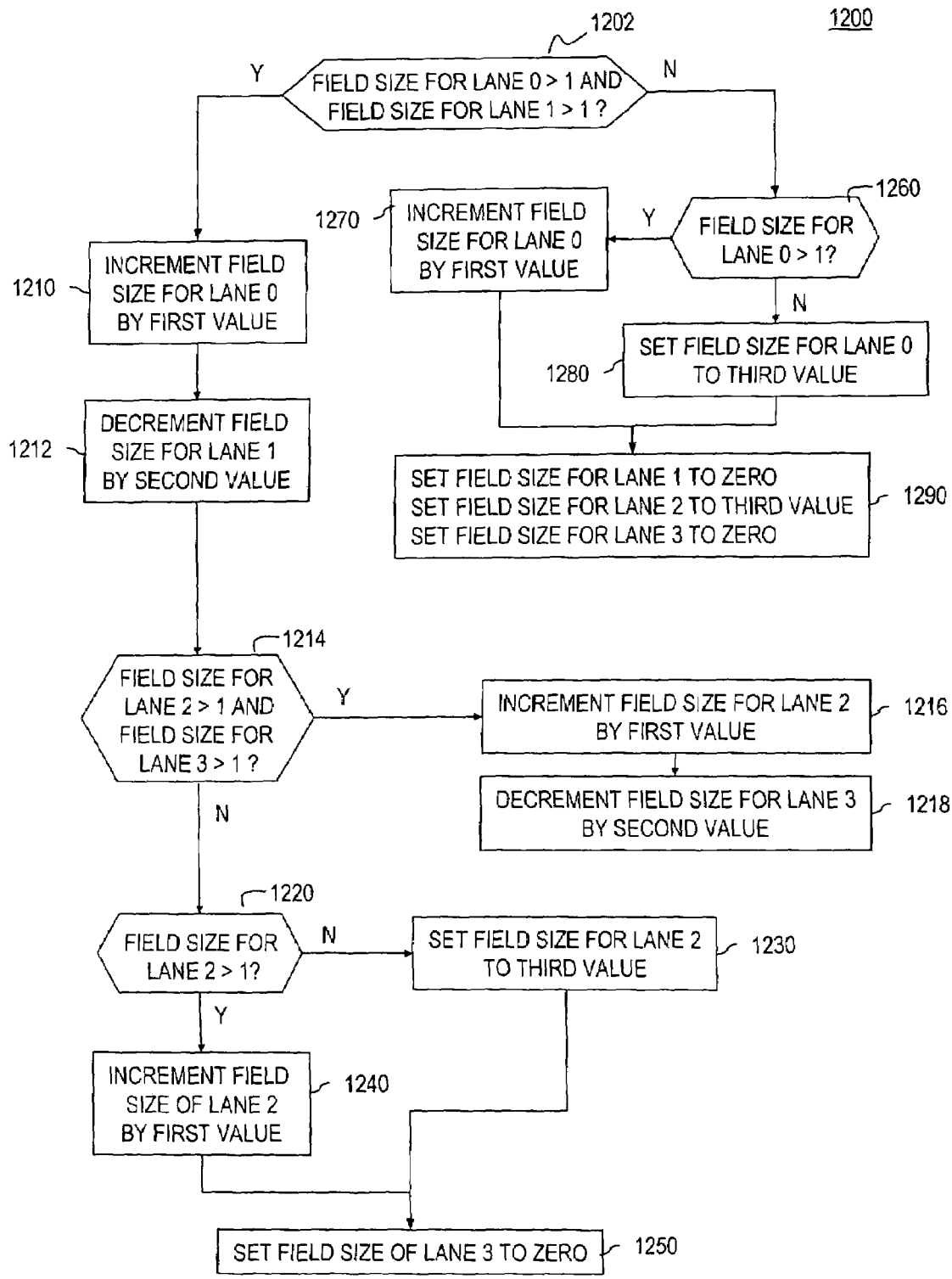
FIG. 12 depicts a flowchart of exemplary first and second techniques for determining modified field sizes in a system using four half-word lanes, according to embodiments of the present invention.

FIG. 12 depicts a flowchart 1200 of exemplary first and second techniques for determining modified field sizes in a system using four half-word lanes, according to embodiments of the present invention. Steps 1202-1218 describe the first technique and steps 1202 and 1220-1290 describe the second technique. Note that some of the steps in flowchart 1200 do not have to occur in the order shown. As would be appreciated by persons of skill in the art, other techniques for determining modified field sizes can be used with the present invention.

In step 1202, a determination is made whether the field sizes for lane 0 and lane 1 are greater than one. If both field sizes are greater than one, operation proceeds to step 1210. If one or both field sizes are less than or equal to one, operation proceeds to step 1260.

In step 1210, the field size for lane 0 is incremented by a first value. In an embodiment, the first value is set to 1.

In step 1212, the field size for lane 1 is decremented by a second value. In an embodiment, the second value is set to 2.

In step 1214, a determination is made whether the field sizes for lane 2 and the field sizes for lane 3 are greater than one. If both field sizes are greater than one, operation proceeds to step 1216. If one or both field sizes are less than or equal to 1, operation proceeds to step 1220.

In step 1216, the field size for lane 2 is incremented by a first value. In an embodiment, the first value is set to 1.

In step 1218, the field size for lane 3 is decremented by a second value. In an embodiment, the second value is set to 2.

In step 1220, a determination is made whether the field size for lane 2 is greater than 1. If the field size for lane 2 is greater than 1, operation proceeds to step 1240. Note that if the field size for lane 2 is greater than 1, then the field size for lane 3 is necessarily less than or equal to 1. If the field size for lane 2 is less than or equal to 1, operation proceeds to step 1230.

In step 1230, the field size for lane 2 is set to a third value. In an embodiment, the third value is set to 3. Operation then proceeds to step 1250.

In step 1240, the field size for lane 2 is incremented by the first value. Operation then proceeds to step 1250.

In step 1250, the field size of lane 3 is set to zero.

In step 1260, a determination is made whether the field size for lane 0 is greater than 1. If the field size for lane 0 is greater than 1, operation proceeds to step 1270. Note that if field size for lane 0 is greater than 1, then the field size for lane 1 is necessarily less than or equal to 1. If the field size for lane 0 is less than or equal to 1, operation proceeds to step 1280.

In step 1270, the field size for lane 0 is incremented by the first value. Operation then proceeds to step 1290.

In step 1280, the field size for lane 0 is set to the third value. Operation then proceeds to step 1290.

In step 1290, the field size for lane 1 is set to zero; the field size for lane 2 is set to the third value; and the field size for lane 3 is set to zero.

Returning to FIG. 11, in step 1160, multiple consecutive bit fields are read from the source reservoir, according to the modified field sizes determined in step 1140 or 1150, and the bit fields are written into the respective lane in the destination.

In step 1165, the form of the instruction is determined. The form of the instruction is indicated in the opcode of the instruction. For example, if the instruction is a simple extract instruction, operation proceeds to step 1170. If the instruction is an extract with fill instruction, operation proceeds to step 1180. Note that step 1165 is included primarily for description purposes and may be omitted or performed earlier in the process flow.

In step 1170, the count of the number of bits in the reservoir is updated. Step 1170 is described in further detail above in reference to FIG. 4.

Steps 1180-1188 are equivalent to steps 740-780 described above in reference to FIG. 7. Therefore, the description of these steps is not included in the discussion of FIG. 11.

In step 1190, normal extract or extract with fill processing is performed, as described above in sections 2.1 and 2.2. In normal processing, the number of bits extracted for each lane from the reservoir by the instruction is exactly as specified in the field sizes register.

3. Bit Combine Instructions

3.1 Combine

Figure 9:
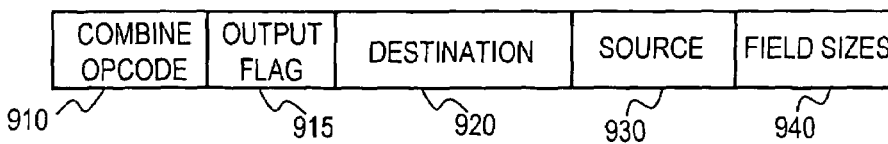
FIG. 9 illustrates an exemplary format for combine instructions, according to embodiments of the present invention.

FIG. 9 illustrates an exemplary format for combine instruction 900, according to an embodiment of the present invention. Bit combine functionality is complementary to the extract functionality described above. At a high level, a combine instruction combines a set of bit fields, each independently sized, into a continuous sequence within an internal combination reservoir. The instruction can also remove a complete unit (e.g., a 64-bit quantity) of data from the combination reservoir and write it as output data into a destination register, if a sufficient number of bits are present in the reservoir. The output flag, also an output from the instruction, is written with an indication as to whether or not output data was produced.

A combine instruction may be used to support the processing in software of decoded QAM data. As would be appreciated by persons of skill in the art, the combine instruction may also be useful in other contexts, for example in the processing of variable-sized fields for compressed bit-streams representing signals such as speech, audio, and video. In the context of xDSL and QAM decoding implemented at least in part by software running on a processor, the combine instruction provides significant savings in terms of both CPU cycles and memory usage, compared to a system in which the bit-field combination function is performed using a sequence of conventional, simpler instructions, performing operations including, but not limited to, a bit-wise shift, mask (AND), union (OR), or complement (NOT).

Combine instruction 900 includes a combine opcode 910, an output flag operand 915, a destination operand 920, a source operand 930, and a field sizes operand 940. The destination operand 920 is a reference to a register or registers for writing a unit of compacted data from the combination reservoir. In an embodiment, destination operand 920 identifies a single register configured to receive a 64-bit unit of compacted data from the combination reservoir. In alternative embodiments, the destination operand 920 could identify multiple registers, for example by containing the register number of the first register in a pair of registers, or in a larger consecutive set of registers. Output flag operand 915 identifies a register or other location to which an indication will be written as to whether a unit or units of output data were produced by execution of combine instruction 900. The source operand 930 is a reference to a register containing multiple half-word lanes. One skilled in the art will appreciate that many other ways of organizing combine instruction 900 are possible. In another embodiment, the opcode and the various operands may be presented in different order from that shown in FIG. 9. In another embodiment, there may be additional bits in the format of the instruction beyond those necessary to represent the opcode and operands, which do not serve any specific purpose for execution of combine instruction 900. These additional bits may occur in any position or positions within the instruction. In another embodiment, any of the opcode or operands may be represented using a set of bits that do not form a single continuous element as shown in FIG. 9, but are distributed in smaller parts across the instruction. In alternative embodiments, some or all of the operand fields may be implicit and hence not identified explicitly in the instruction; for example, a specific register in the processor (e.g. one of the general purpose registers 155, or another register) may be pre-designated as the location from which a given operand is obtained, or as the destination register to which a result is written. FIG. 3 illustrates an exemplary 64-bit register having four half-word lanes. The field sizes operand 940 is a reference to a field sizes register which specifies for each of the source half-word lanes how many bits of data are contained in that lane. In an embodiment, the source, destination, and field sizes registers are general purpose registers 155. In an embodiment, output flag operand 915 identifies one of the predicate registers 165. Similar considerations apply, concerning the possible representations of the output flag, as were discussed above in relation to the fill flag operand 615 of extract with fill instruction 600.

Combine instruction 900 produces output data as a single unit (e.g., a 64-bit unit). In an alternative embodiment, the output data may be larger, e.g., it could be presented as a 128-bit value to be written to a pair of 64-bit registers.

The following is an exemplary combine instruction using the format described above in relation to FIG. 9, in which 'BCGH' is the symbolic representation of a combine opcode 910, 'outFlag' identifies a predicate register 165 as output flag operand 915, 'longOut' identifies one of the general purpose registers 155 as destination operand 920, 'fieldsIn' identifies one of the general purpose registers 155 as field sizes operand 940 and 'fieldsIn' identifies one of the general purpose registers 155 as source operand 930. Other representations of combine instruction 900 are possible.

BCGH (outFlag, longOut), fieldsIn, fieldSizes

Figure 10:
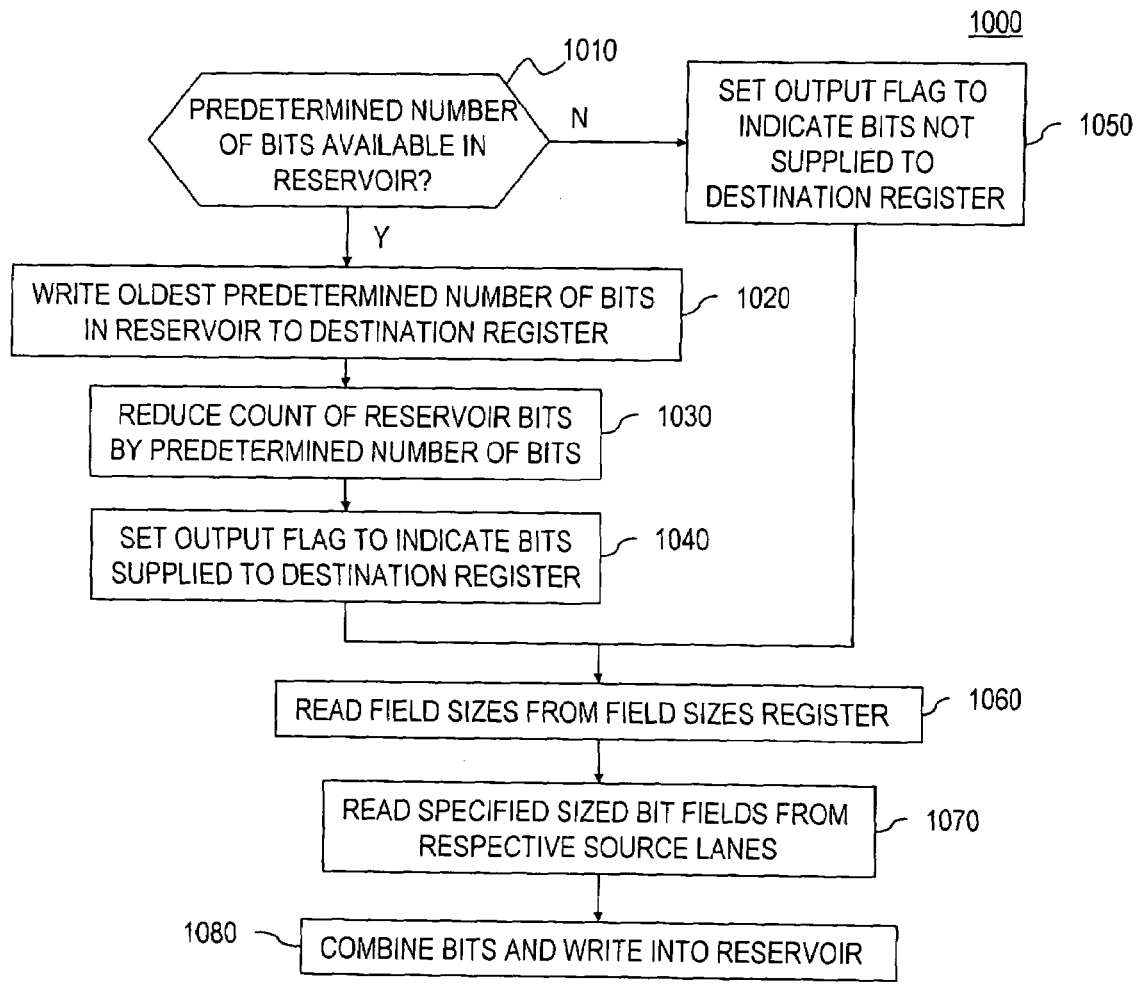
FIG. 10 depicts a flowchart of an exemplary operation of a combine instruction, according to embodiments of the present invention.

FIG. 10 depicts a flowchart 1000 of an exemplary operation of a combine instruction 900, according to embodiments of the present invention. Note that some of the steps in flowchart 1000 do not necessarily have to occur in the order shown.

In step 1010, a determination is made as to whether a predetermined number of bits are available in the combination reservoir. For example, the predetermined number of bits may be set to 64 bits. The combination reservoir holds a continuous sequence of data bits, written and compacted during previous combine instructions. In an embodiment, the combination reservoir is effectively a bit-level FIFO. As would be appreciated by persons of skill in the art, other implementations for the combination reservoir can be used with the present invention. If the predetermined number of bits are available, operation proceeds to step 1020. If the predetermined number of bits are not available, operation proceeds to step 1060.

In step 1020, the oldest predetermined number of bits in the combination reservoir are written to the destination register. In an embodiment, the output is normally ordered in "little-endian" order, in which the oldest (least recently processed) bits occur at the least-significant (left-hand) end of the combination reservoir. In an example system using a sixty four bit destination, the bit in the destination which was first placed into the combination reservoir by an earlier combine instruction appears in position 0 (LSB) of the destination, and the bit in the destination which was most recently placed into the combination reservoir by an earlier combine instruction appears in position sixty-three (MSB) of the destination.

Alternatively, a variant of the combine instruction can be used in which the output order is reversed. In an example system using a sixty four bit destination, the most recently combined bit in the destination is at position 0 with the earliest combined bit in the destination being at position 63. One purpose of this variation is to support the use of the bit combiner in conjunction with trellis decoding instructions. Because in at least one implementation of a trellis decoding algorithm, the natural order of generation of bits is essentially 'backwards' (or "big-endian"), it is necessary to have some efficient way to reverse them later. This is most conveniently done in the context of the bit combiner output stage rather than its input stage, since much greater complication is implied in order to deal with variable sized input fields in either normal (little-endian) or backward (big-endian) order, than to optionally bit-reverse the whole sixty four bit output longword.

In step 1030, the count of the number of bits in the combination reservoir is reduced by the predetermined number of bits. For example, if the combination reservoir contained 122 bits and 64 bits were written to the destination register, the bit count would be reduced to 58. In an embodiment, the count of the number of bits in the reservoir is taken prior to the effecting of the combine operation (which may increase the number of bits in the combination reservoir). In another embodiment, the count is taken after the effecting of the combine operation.

In step 1040, an output flag is written to indicate that new bits were removed from the combination reservoir and written to the destination register. The output flag is used to indicate that the destination register should be further processed. In an embodiment, the output flag is a predicate register 165.

In step 1050, an output flag is written to indicate that no new bits were written to the destination register. In an embodiment, the output flag is a predicate register 165. The output flag is used to indicate that the destination register should not be further processed.

In step 1060, the field size for the bit field of each lane of the source is read from the field sizes register. In an embodiment, the field size of each variable sized data bit field can have a value between 0 and 16 bits. In other embodiments, the field size of each variable sized data bit field can vary over a wider range, depending on the width of the destination lanes.

In step 1070, bit fields having the sizes specified in step 1060 are read from the respective lanes of the source register.

In step 1080, the supplied bits are combined into a continuous sequence and written into the combination reservoir. In consequence (but not shown in flowchart 1000) the count of the number of bits in the combination reservoir is increased by the total number of bits supplied in step 1080.

3.2 Combine in Trellis Encoding Mode

Figure 13:
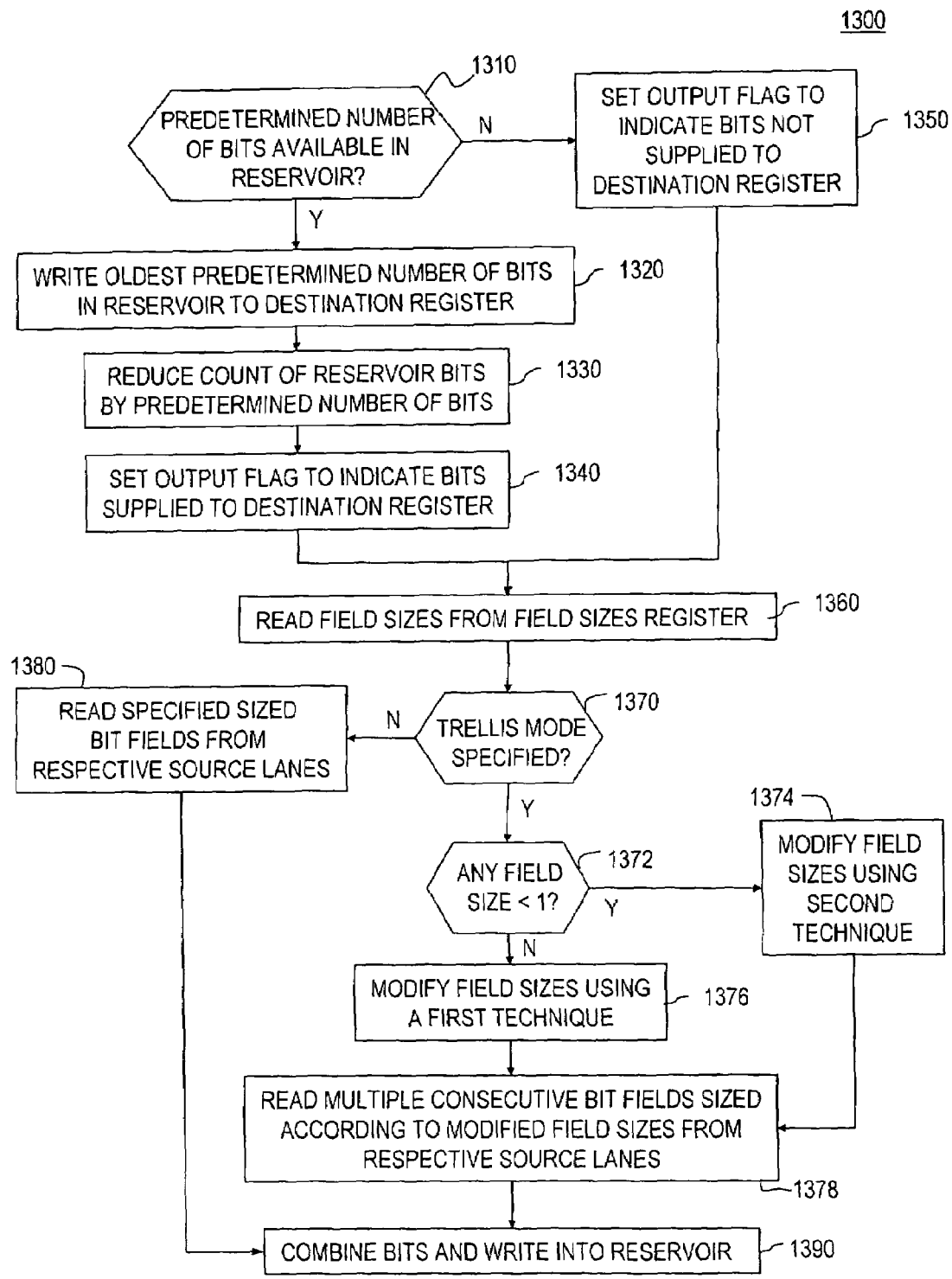
FIG. 13 depicts a flowchart of an exemplary operation of combine instruction in a trellis encoding mode, according to embodiments of the present invention.

FIG. 13 depicts a flowchart 1300 of an exemplary operation of combine instruction in trellis encoding mode, according to embodiments of the present invention. Note that some of the steps in flowchart 1300 do not necessarily have to occur in the order shown.

Steps 1310-1360 are analogous to steps 1010-1060 described above in reference to FIG. 10. Therefore, the description of these steps is not included in the discussion of FIG. 13.

In step 1370, a determination is made as to whether trellis mode has been specified. In an embodiment, the use of trellis mode is distinguished by means of the value used for combine opcode 910: a first value indicates trellis mode is to be used, while a second value indicates that trellis mode is not to be used. In another embodiment, a trellis mode flag (e.g., in one of the control registers 160) is used to indicate whether trellis mode is to be used in the instruction. If trellis mode is specified, operation proceeds to step 1372. If trellis mode is not specified, operation proceeds to step 1380.

In step 1372, a determination is made whether any of the field sizes read from the field sizes register is less than or equal to 1. If one or more of the field sizes is less than or equal to 1, operation proceeds to step 1374. If each of the field sizes is greater than 1, operation proceeds to step 1376.

In step 1374, the field sizes read from the field sizes register are modified according to a second technique. The second technique relates to the special situation where the number of bits requested for a lane (i.e., one of the field sizes) is 1 or 0. Operation then proceeds to step 1378.

In step 1376, the fields sizes read from the field sizes register are modified according to a first technique. In an embodiment, the field sizes are alternatively incremented by 1 and decremented by 2. For example, in the four lane embodiment depicted in FIG. 5, the field sizes are updated by the first technique as follows:

fieldSizesMod.lane0=fieldSizes.lane0+1 fieldSizesMod.lane1=fieldSizes.lane1−2 fieldSizesMod.lane2=fieldSizes.lane2+1 fieldSizesMod.lane3=fieldSizes.lane3−2

FIG. 12, above, describes exemplary first and second techniques for determining the modified field sizes. As would be appreciated by persons of skill in the art, other techniques for determining modified field sizes can be used with the present invention.

In step 1378, multiple consecutive bit fields are read from the respective lanes of the source register, according to the modified field sizes determined in step 1374 or 1376.

In step 1380, bit fields having the sizes specified in step 1060 are read from the respective lanes of the source register In step 1390, the supplied bits are combined into a continuous sequence and written into the combination reservoir. In consequence (but not shown in flowchart 1300) the count of the number of bits in the combination reservoir is increased by the total number of bits supplied in step 1380.

4. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing, in a processor, a plurality of bit field extractions to populate a plurality of destination lanes via a single instruction, comprising:
   (a) reading a plurality of bit field sizes, one bit field size per destination lane;
   (b) reading a plurality of bit fields from a source reservoir of bits, one bit field per destination lane, wherein the number of bits in each bit field is determined by the bit field size of its respective destination lane;
   (c) writing each bit field into a respective one of the plurality of destination lanes;
   (d) reducing a value of a count of the number of bits in the source reservoir by the sum of the bit field sizes read in step (a);
   (e) reading fill data from at least one fill data register designated as an operand in the instruction if the count of the number of bits in the source reservoir is less than a predetermined number;
   (f) writing a first value of a fill flag indicating that data from the at least one designated fill data register was used during execution of the instruction; and
   (g) increasing the value of the count of the number of bits in the source reservoir by the number of bits read from the at least one designated fill data register.

2. The method of claim 1, wherein if the size of the bit field for a destination lane is less than the size of the destination lane,
   setting the remaining bits in the destination lane to zero.

3. The method of claim 1, wherein step (c) further comprises:
   writing each bit field beginning at the least significant end of the destination lane.

4. The method of claim 1, further comprising:
   (h) writing a second value of a fill flag indicating that data from at least one fill data register designated in the instruction was not used during execution of the instruction if the count of the number of bits in the source reservoir is greater than or equal to a predetermined number.

5. A method for performing, in a processor, a plurality of bit field extractions to populate a plurality of destination lanes via a single instruction, wherein trellis encoding is to be applied to the data contained in the plurality of destination lanes, comprising:
   (a) reading a plurality of bit field sizes, one bit field size per destination lane;
   (b) modifying the plurality of bit field sizes according to a first technique if each of the plurality of bit field sizes is greater than one;
   (c) modifying the plurality of bit field sizes according to a second technique if at least one of the plurality of bit field sizes is less than or equal to one;
   (d) reading a plurality of bit fields from a source reservoir of bits, one bit field per destination lane, wherein the number of bits in each bit field is determined by the modified bit field size of its respective destination lane;
   (e) writing each bit field into a respective one of the plurality of destination lanes; and
   (f) reducing a value of a count of the number of bits in the source reservoir by the sum of the modified bit field sizes.

6. The method of claim 5, wherein step (b) further comprises:
   for each pair of destination lanes, (i) incrementing the bit field size of a first destination lane in the pair of destination lanes by a first value; and (ii) decrementing the bit field size of a second destination lanes by a second value.

7. The method of claim 6, wherein the first value is one and the second value is two.

8. The method of claim 5, wherein if the modified size of the bit field for a destination lane is less than the size of the destination lane, setting the remaining bits in the destination lane to zero.

9. The method of claim 5, further comprising:

(g) reading data from at least one fill data register designated as an operand of the instruction and writing it into the source reservoir if the count of the number of bits in the source reservoir is less than a predetermined number;

(h) writing a first value for a fill flag indicating that data from the at least one designated fill data register was used during execution of the instruction; and (i) increasing the value of the count of the number of bits in the source reservoir by the number of bits read from the at least one designated fill data register.

10. The method of claim 9, further comprising:

(j) writing a second value for a fill flag indicating that data from at least one designated fill data register was not used during execution of the instruction if the count of the number of bits in the source reservoir is greater than or equal to a predetermined value.

11. A processor comprising:

a plurality of general purpose registers;

a plurality of predicate registers; and at least one execution unit configured to extract a plurality of bit fields from a source reservoir by reading a plurality of bit field sizes, one bit field size per destination lane, modifying the plurality of bit field sizes according to a first technique if each of the plurality of bit field sizes is greater than one, modifying the plurality of bit field sizes according to a second technique if at least one of the plurality of bit field sizes is less than or equal to one, reading a plurality of bit fields from a source reservoir of bits, one bit field per destination lane, wherein the number of bits in each bit field is determined by the modified bit field size of its respective destination lane, and reducing a value of a count of the number of bits in the source reservoir by the sum of the modified bit field sizes, and to populate a plurality of destination lanes in response to a single instruction executable by the processor, wherein data for each destination lane is written to one of the plurality of general purpose registers by the at least one execution unit.

12. The processor of claim 11, wherein the at least one execution unit is further configured to read data from at least one fill data register if a count of a number of bits in the source reservoir of bits is less than a determined number in response to the single instruction executable by the processor.

13. The processor of claim 11, wherein the processor comprises two execution units.

14. The processor of claim 11, wherein the processor is a sixty-four bit long instruction word processor including two single instruction multiple data execution units.

* * * * *